Sept. 27, 1955      A. SOSS      2,718,698
ELECTRICALLY OPERATED CLEAVER
Filed July 16, 1954      2 Sheets-Sheet 1
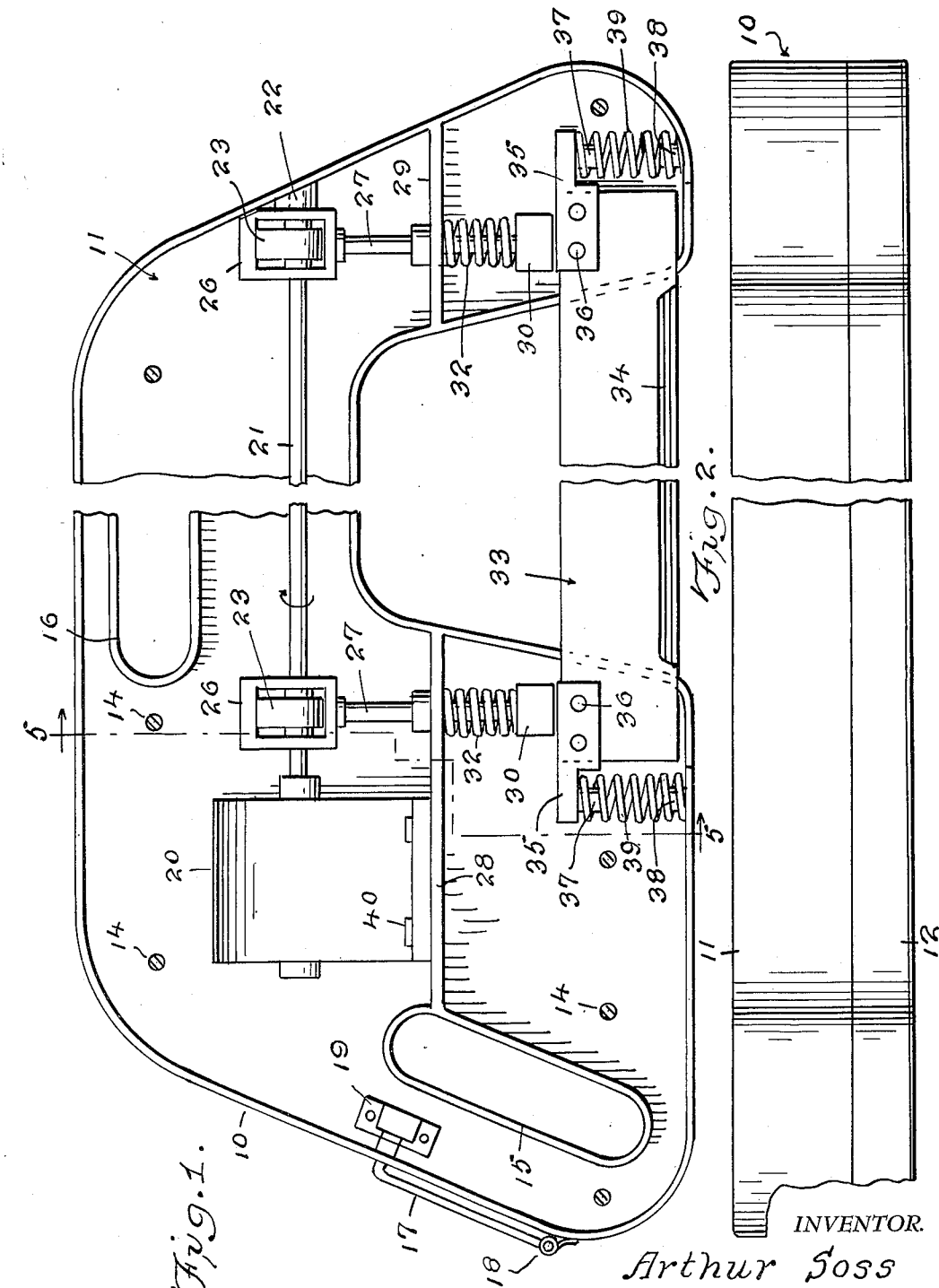
INVENTOR.
Arthur Soss
BY *Victor J. Evans & Co.*
ATTORNEYS Sept. 27, 1955  A. SOSS  2,718,698
ELECTRICALLY OPERATED CLEAVER
Filed July 16, 1954  2 Sheets-Sheet 2
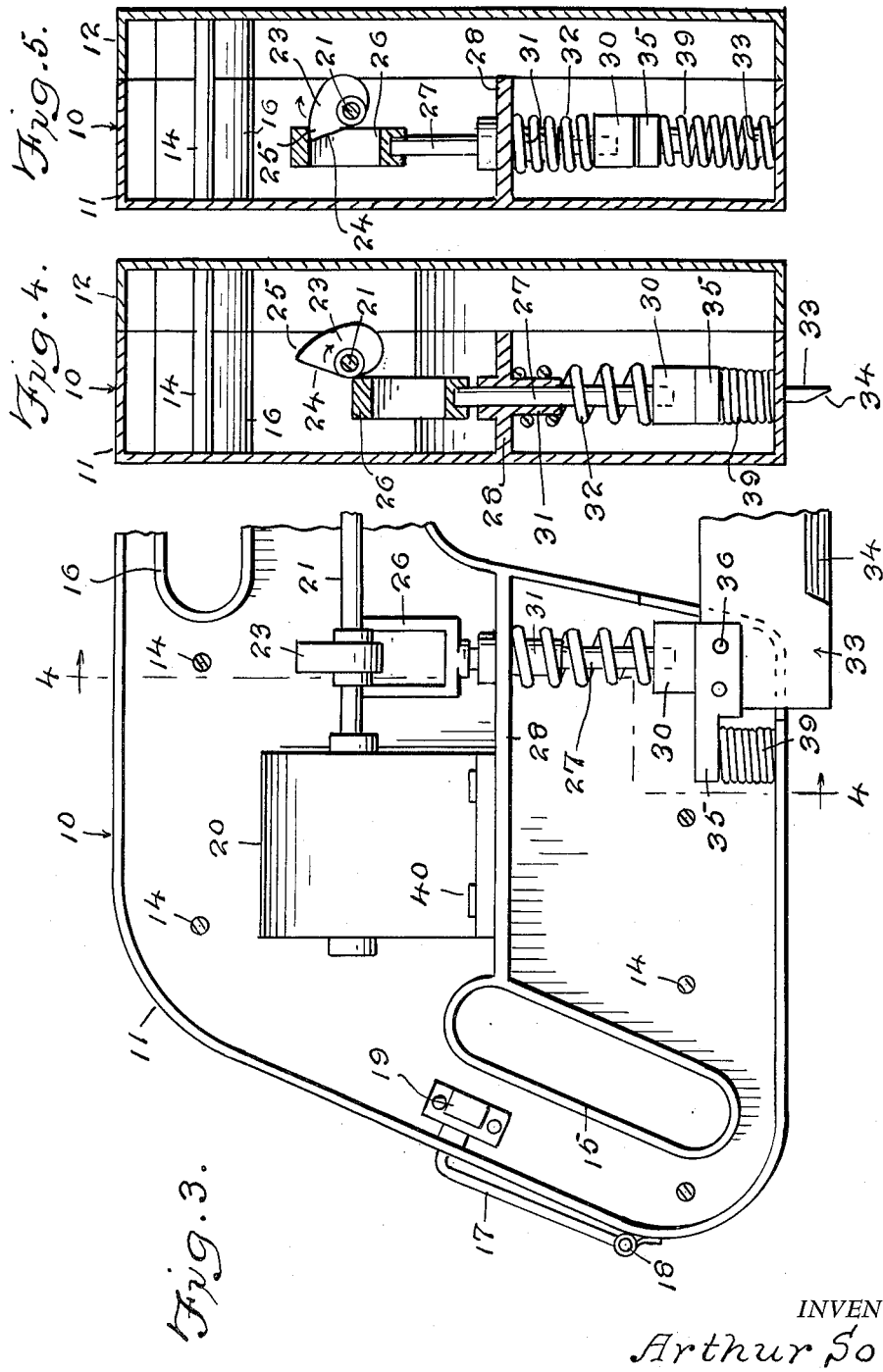
INVENTOR.
Arthur Soss
BY Victor J. Evans &Co.
ATTORNEYS

United States Patent Office 2,718,698
Patented Sept. 27, 1955

2,718,698

ELECTRICALLY OPERATED CLEAVER

Arthur Soss, McCook, Nebr.

Application July 16, 1954, Serial No. 443,728

1 Claim. (Cl. 30—272)

This invention relates to a cutter, and more particularly to a power operated cleaver for cutting meat, animal carcasses and the like.

This invention is an improvement over the cleaver shown and described in my co-pending application, Serial No. 349,842, filed April 20, 1953.

The object of the invention is to provide a meat cutting cleaver which includes a frame or housing that has a blade movably mounted therein, there being a motor mounted in said housing and adapted to be connected to a source of electrical energy, the motor being operatively connected to the blade for causing reciprocation thereof.

Another object of the invention is to provide a cleaver for splitting animal carcasses and the like wherein there is provided a movable cutting blade that has a means for causing reciprocation thereof, the cleaver including a gripping means and a manually operable switch for controlling actuation of the motor which reciprocates the blade.

A further object of the invention is to provide a cleaver that is ruggedly constructed and easy to use.

Other objects and advantages will be apparent during the course of the following description.

In the accompanying drawings forming a part of this application, and in which like numerals are used to designate like parts throughout the same:

Figure 1 is a side elevational view of the cleaver of the present invention, with one of the side plates or sections of the housing removed and showing the blade in its retracted position.

Figure 2 is a fragmentary top plan view of the cleaver.

Figure 3 is a fragmentary view similar to Figure 1 but showing the position of the parts when the blade is extended.

Figure 4 is a sectional view taken on the line 4—4 of Figure 3.

Figure 5 is a view similar to Figure 4 but showing the cam engaging one of the brackets, the Figure 5 position corresponding to the position shown in Figure 1, while the Figure 4 position corresponding to the position of the parts shown in Figure 3.

Referring in detail to the drawings, the numeral 10 designates a housing which is hollow and which can be made of any suitable material, and the housing 10 includes a pair of sections or casings 11 and 12 which are detachably connected together by means of bolt and nut assemblies 14. The housing 10 is further provided with a plurality of openings 15 and 16 which define handles or hand grips so as to facilitate the manual gripping or holding of the cleaver.

A hinge pin 18 pivotally connects a manually operable switch member 17 to an end of the housing 10, and the switch member 17 is adapted to actuate a switch 19 which may be electrically connected to the electric motor 20 in any suitable manner.

Connected to the motor 20 and operated thereby is a shaft 21 which has one end journaled in a bearing 22, Figure 1. A pair of cams 23 are secured to or mounted on the shaft 21 in any suitable manner, and each of the cams 23 has the same construction and each includes a flat surface 24 and a pointed end 25, Figures 4 and 5. The cams 23 are arranged in engagement with rectangular open brackets 26, and the brackets 26 are secured to the upper ends of a pair of reciprocating spaced parallel rods 27. The rods 27 project through plates 28 and 29 which are mounted in the housing 10. A head 30 is mounted on the lower end of each of the rods 27, and the rods 27 slidably project through guide bushings 31 which may be integral with or secured to the plates. A coil spring 32 is circumposed on each rod 27 and abuts each head 30 for normally urging the heads 30 towards a reciprocating blade 33. The blade 33 includes a cutting edge 34 and the blade 33 is slidably or reciprocably mounted in the housing 10.

Secured to each end of the blade 33 adjacent its upper surface is a tongue 35, and the tongue 35 may be secured in place by suitable securing elements 36.

Depending from the outer end of each of the tongues 35 is a guide pin 37, there being a similar guide pin 38 arranged opposite the guide pin 37, the guide pins 38 being secured to the housing 10. A pair of coil springs 39 are provided, and the coil springs 39 are interposed between the tongues 35 and the adjacent portion of the housing 10, the coil springs 39 being held in their proper position by means of the guide pins 37 and 38. The motor 20 may be secured in place to the plate 28 by suitable securing elements 40.

From the foregoing it is apparent that there has been provided a cleaver which is electrically operated and wherein the cleaver can be used for easily cutting carcasses, meat and the like. In use the cleaver is gripped by inserting the hands or fingers through the openings 15 and 16 and then the cutting edge 34 of the blade 33 is arranged in engagement with the article to be cut. Then, the member 17 is manually depressed so that the switch member 19 will cause energization of the motor 20 which is connected to a suitable source of electrical energy. This in turn will cause rotation of the shaft 21 and as the shaft rotates in the direction of the arrows in Figures 4 and 5, the pair of cams 23 will rotate and move so that the pointed ends 25 project into the brackets 26 to lift the brackets 26 to the position shown in Figure 5 and as the brackets 26 are raised upwardly the rods 27 will also be lifted. As the rods 27 are lifted the pair of springs 32 will be compressed and as the shaft 21 continues to rotate the cams 23 will move to the position shown in Figure 4 from the position shown in Figure 5 whereby the brackets 26 will be released from engagement with the cams 23 so that the coil springs 32 will quickly urge or bias the heads 30 and rods 27 downwardly. These heads 30 on the lower ends of the rods 27 will then abut or engage the blade 33 to drive the blade outwardly of the housing 10 from the position shown in Figure 1 to the position shown in Figure 3 so that the cutting edge 34 will effectively cut the meat. Next, the pressure built up by the compressed springs 39 will return the blade 33 from the position shown in Figures 3 and 4 to the position shown in Figures 1 and 5 and this cycle will be repeated so that there will be imparted to the blade 33 a continuous reciprocatory movement which will result in effective cutting of the meat. When pressure is released on the member 17, the spring hinge 18 will disconnect the circuit leading to the motor 20 so that further reciprocation of the blade 33 will be prevented.

When the springs 32 are compressed, power is built up to drive the heads 30 against the blade 33 and when the cams 23 release the rods 27 there will result a reciprocation of the blade 33.

I claim:

A power operated cleaver, comprising a hollow housing embodying a first and second casing arranged in superposed relation with respect to each other, said casings being detachably connected together, there being spaced apart openings in said housing defining hand grips, a pair of plates mounted in said housing, a motor mounted on one of said plates and adapted to be connected to a source of electrical energy, a shaft having one end connected to said motor, a pair of spaced apart cams mounted on said shaft, a blade movably mounted in said housing, a tongue secured to each end of said blade and arranged adjacent the inner portion thereof, a pair of spaced parallel rods reciprocably mounted in said housing and projecting through said plates, a bracket connected to the upper end of each of said rods and engaging said cams, a head mounted on the lower end of each of said rods for engagement with said tongues, a coil spring circumposed on each of said rods and interposed between said plates and heads, and resilient means arranged in engagement with said tongues, said resilient means comprising coil springs abutting said tongues, and guide pins arranged in engagement with said last named coil springs.

References Cited in the file of this patent

UNITED STATES PATENTS

| | | |
|---|---|---|
| 1,764,828 | Cotton | June 17, 1930 |
| 2,027,396 | Meyer | Jan. 14, 1936 |
| 2,043,684 | Walter | June 9, 1936 |
| 2,080,200 | Demosky et al. | May 11, 1937 |
| 2,232,367 | Cherry | Feb. 18, 1941 |
| 2,422,005 | Frank | June 10, 1947 |